United States Patent [19]

Huguet

[11] Patent Number: 4,952,776
[45] Date of Patent: Aug. 28, 1990

[54] SEAT HEATING DEVICE IN PARTICULAR FOR AN AUTOMOTIVE VEHICLE

[75] Inventor: Pascal Huguet, Hericourt, France

[73] Assignees: Automobiles Peugeot, Paris; Automobiles Citroen, Neuilly-Sur-Seine, both of France

[21] Appl. No.: 373,161

[22] Filed: Jun. 29, 1989

[30] Foreign Application Priority Data

Jul. 1, 1988 [FR] France ................................ 88 08952

[51] Int. Cl.⁵ .............................................. H05B 3/36
[52] U.S. Cl. ..................................... 219/217; 219/528
[58] Field of Search ............... 219/211, 217, 528, 529, 219/549

[56] References Cited

U.S. PATENT DOCUMENTS

| 2,441,005 | 5/1948 | Bradford | 219/549 |
| 3,013,141 | 12/1961 | Ellis | 219/528 |
| 3,017,493 | 1/1962 | Cooke | 219/217 |
| 4,590,359 | 5/1986 | Moebius | 219/217 |
| 4,695,091 | 9/1987 | Altmann et al. | 297/180 |

FOREIGN PATENT DOCUMENTS

| 272944 | 2/1966 | Australia | 219/217 |
| 0226692 | 7/1987 | European Pat. Off. | |
| 7905101 | 5/1979 | Fed. Rep. of Germany | |
| 8137914 | 9/1982 | Fed. Rep. of Germany | |
| 54-145034 | 11/1979 | Japan | 219/549 |
| 931203 | 7/1963 | United Kingdom | 219/528 |
| 1077798 | 8/1967 | United Kingdom | 219/217 |

Primary Examiner—Teresa J. Walberg
Attorney, Agent, or Firm—Kenyon & Kenyon

[57] ABSTRACT

A seat heating device for automotive vehicles including a sheet containing a network of electrically conducting lead wires and connected to the lining cap covering the sheet, wherein said electric network is divided into heating boxes while leaving between two adjacent boxes an intermediate zone extending throughout the width of the sheet and devoid of conductor lead wires, any two adjacent boxes being electrically connected by lead wires extending out of the sheet and forming separate loops, the sheet being adapted to be sewn to the lining cap along a seam within the intermediate zone and said loops being high enough to be outside of the sewing zone when they are spread out in the plane of the sheet.

7 Claims, 1 Drawing Sheet

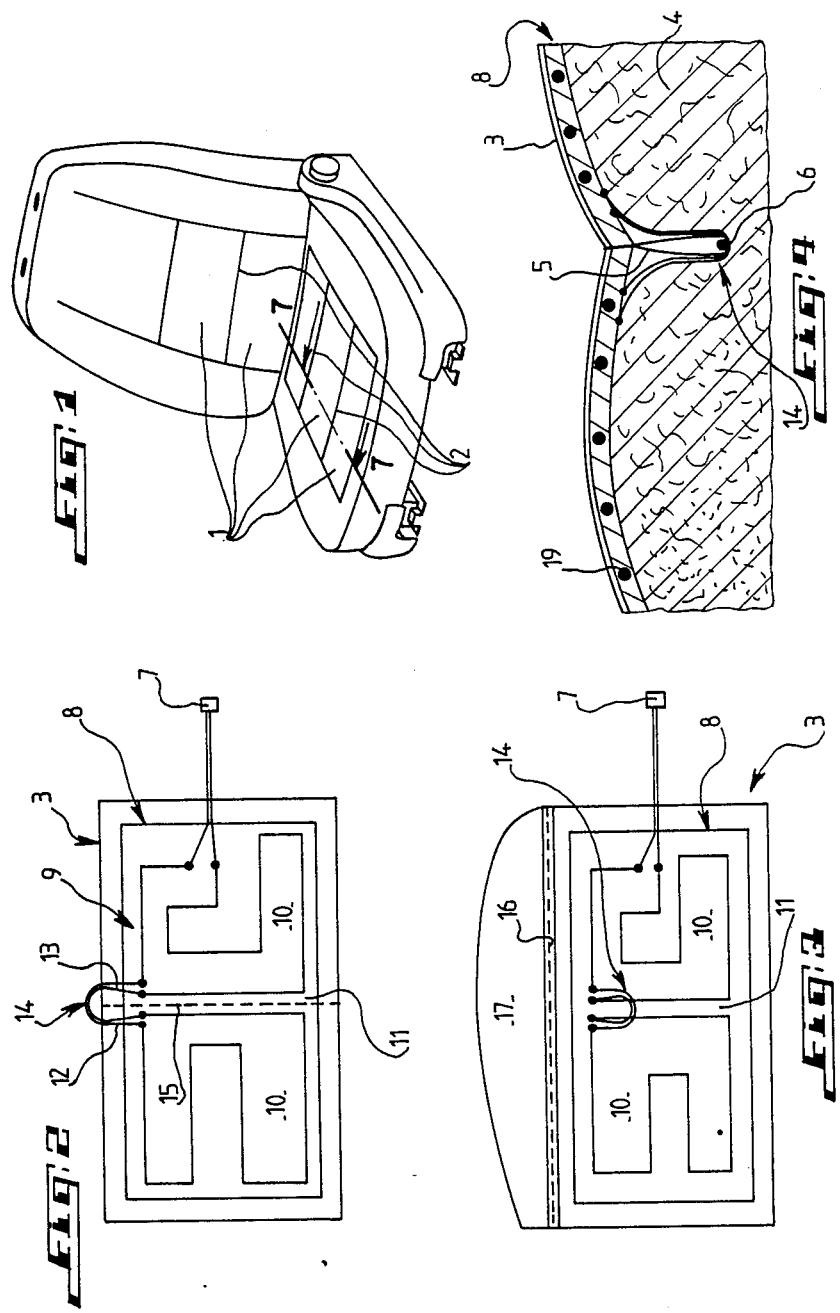

SEAT HEATING DEVICE IN PARTICULAR FOR AN AUTOMOTIVE VEHICLE

The present invention relates to a seat heating in particular for an automotive vehicle of the kind comprising a sheet containing a network of lead wires conducting an electric current and forming heating elements which is connected to the lining cap covering said seat.

It is more and more frequent to integrate the heating in particular of the seatings into the lining cap of the seat itself. In particular in the case of seats which exhibit aesthetic curved surfaces and comprise for that purpose transverse bracings, the configuration of the electric network inside the sheet does not make possible the sewing of the sheet underneath the cap without any risk of cutting off the electric network.

The object of the invention is to provide a heating device which does no longer exhibit the drawback referred to hereinabove.

To reach this aim the device according to the invention is characterized in that the electric network of the sheet is divided into heating boxes or pads while leaving between two adjacent boxes an intermediate area extending throughout the width of the sheet and devoid of conducting lead wires and in that two adjacent boxes are electrically connected by lead wires which extend out of the sheet and form separate loops, the sheet being adapted to be sewn to the lining cap along a seam extending inside of said intermediate area and said loop having a height sufficient to be outside of the sewing zone when it is spread in the plane of the sheet.

According to an advantageous characterizing feature of the invention two boxes are connected by a bifilar loop.

According to another advantageous characterizing feature of the invention the loop is adapted to be folded below the sheet so that it may be sewn underneath the covering cap along its longitudinal edges.

According to still a further advantageous characterizing feature of the invention with a seat including curved surfaces the intersection of which exhibits a projecting re-entrant angle and wherein the cover cap is retained in the intersection zone by means of bracing braids secured to holding rods arranged inside of the padding body of the seat, the connecting loops of adjacent heating boxes having a height sufficient to allow its conducting lead wires to extend underneath the rods.

The invention will be better understood and further objects, characterizing features, details and advantages thereof will appear more clearly as the following explanatory description proceeds with reference to the accompanying diagrammatic drawings given by way of non limiting example only illustrating a presently preferred specific embodiment of the invention and wherein:

FIG. 1 is a diagrammatic perspective view of an armchair provided with a heating device according to the invention;

FIG. 2 is a diagrammatic view of a heating device wherein the sheet exhibits a transverse seam;

FIG. 3 is a diagrammatic view of a heating device according to the invention where the sheet exhibits a longitudinal seam; and FIG. 4 is a view in longitudinal section with parts broken away taken upon the line IV—IV of FIG. 1 and showing a seat with a curved seating into which is incorporated a heating device according to the invention.

The invention will be explained as being applied to a vehicle seat such as shown on FIG. 1, which comprises aesthetic curved surfaces 1 the intersection zones 2 of which exhibit a projecting re-entrant angle.

Referring to FIG. 4 it is seen that the lining cap or cover 3 of the seat in order that it may perfectly conform to the curves and in particular to the re-entrant angles of the padding 4 is applied thereagainst by means of bracing braids 5 made fast with the cap or cover 3 and of tensioning rods 6 which are incorporated into the padding 4 in a manner known per se.

The heating device according to the invention comprises a sheet 8 into which is integrated a network 9 of electrically conducting lead wires which generates heat when an electric current is flowing therethrough. At 7 have been diagrammatically shown the connecting means of the electric network 9 for connecting the latter to a suitable source of electric power. As shown on FIGS. 2 and 3 the network 9 of conducting lead wires is divided into heating boxes 10 juxtaposed in the longitudinal direction of the sheet 8 while leaving between any two adjacent boxes 10 a zone 11 which extends throughout the width of the sheet and is devoid of conducting lead wires. Both boxes 10 thus separated by the zone 11 are electrically connected by two lead wires 12, 13 which extend out of the sheet and form a bifilar loop 14 outside of the sheet.

As shown on FIG. 2 the height of the loop 14 is such that its base extends sidewise beyond the longitudinal edges of the sheet when it is spread out in the plane of the sheet in substantially symmetrical relation to the intermediate zone 11. There have thus been provided conditions allowing to sew the sheet 8 below the lining cap 3 by a continuous transverse seam or stitching line 15 extending within the intermediate zone 11 without any risk of cutting off the electric network 9.

As illustrated on FIG. 3 by folding back the loop 14 underneath the sheet towards its central portion the sheet may be sewn along its longitudinal edges by means of seams 16 to the side portions 17 of the lining cap 3 without there being the least risk of cutting off the electric network 9.

As shown on FIG. 4 the heating sheet together with its heating boxes 10 provided with integrated electrically conducting lead wires 19 and separated by the intermediate zone 11 is sewn underneath the cover or lining cap 3 while resting upon the padding 4 of the seat. The bracing braids 5 of the cover or cap 3 which are retained by the rods 6 are lying at the intermediate zone 11 with its seam or stitch line 15. To be consistent with this way of retaining the cover sheet 3 upon the padding 4 the loops 14 of the electrically conducting lead wires should exhibit a height which makes it possible to turn round the braids 5 and the corresponding rods 6.

A bifilar loop 14 according to the invention may be made in different ways for instance by means of insulated conductors welded to the heating boxes, by insulated conductors provided with electrical connectors or by insulated lead wires of the heating network which are coiled into a spiral like the cord of a telephone set.

What is claimed is:

1. A seat heating device for a seat having a seat body covered by a lining cap, particularly for an automotive vehicle seat, said device comprising a sheet containing a network of lead wires for conducting an electrical current and forming heating elements, said sheet comprising a plurality of independent heating zones laterally shifted with respect to one another with each zone comprising a portion of said network of lead wires and an intermediate zone between adjacent zones, extending throughout the width of the sheet and devoid of conducting lead wires, the network portions of any two adjacent zones being electrically connected by flexible lead wires which extend out of the sheet and form free flexible loops, said sheet being adapted to be sewn to the lining cap along a seam within each said intermediate zone and said loops having a height sufficient so that each said loop is outside of the seam zone when being spread out in the plane of the sheet.

2. A heating device according to claim 1, wherein any two heating boxes are connected by a bifilar loop.

3. A device according to claim 1, wherein the loops are adapted to be folded back towards the center of the sheet so that the latter may be sewn to the lining cap along its longitudinal edges.

4. A heating device according to claim 1 for a seat including curved surfaces the intersection of which exhibits a projecting re-entrant angle whereas the lining cap is retained in the intersecting region by means of bracing braids secured to holding rods arranged inside of the padding body of the seat, wherein the loops connecting adjacent heating boxes exhibit a height sufficient for the conducting lead wires to extend underneath the holding rods.

5. A heating device according to claim 1, wherein one loop consists of insulated conducting lead wires welded to the heating network.

6. A heating device according to claim 1, wherein one loop consists of insulated conductors provided with electrical connections.

7. A heating device according to claim 1, wherein one loop consists of lead wires of the heating network which are insulated and spirally coiled with axially juxtaposed winding turns.

* * * * *